(12) United States Patent
Wieland

(10) Patent No.: US 10,447,821 B1
(45) Date of Patent: *Oct. 15, 2019

(54) METHOD AND APPARATUS OF PROVIDING THIN CLIENT FUNCTIONALITY

(71) Applicant: OPEN INVENTION NETWORK LLC, Durham, NC (US)

(72) Inventor: Martin Wieland, Munich (DE)

(73) Assignee: OPEN INVENTION NETWORK LLC, Durham, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/925,105

(22) Filed: Mar. 19, 2018

Related U.S. Application Data

(63) Continuation of application No. 15/097,817, filed on Apr. 13, 2016, now Pat. No. 9,923,994, which is a continuation of application No. 13/796,443, filed on Mar. 12, 2013, now Pat. No. 9,325,559.

(51) Int. Cl.
  *H04L 29/06* (2006.01)
  *G06F 13/10* (2006.01)
  *H04L 29/08* (2006.01)

(52) U.S. Cl.
  CPC ............ *H04L 67/42* (2013.01); *G06F 13/102* (2013.01); *H04L 67/10* (2013.01)

(58) Field of Classification Search
  CPC . H04L 29/06047; G06F 9/45533; G06F 8/68; G06F 9/455; G06F 15/173

USPC ......................................................... 709/203
See application file for complete search history.

(56) References Cited

U.S. PATENT DOCUMENTS

| | | | | |
|---|---|---|---|---|
| 7,107,285 B2* | 9/2006 | von Kaenel | ...... | G06F 17/30241 |
| 7,240,141 B2* | 7/2007 | Ning | ...... | G06F 13/4031 |
| | | | | 710/309 |
| 8,631,120 B2* | 1/2014 | Susai | ...... | H04L 29/06 |
| | | | | 709/217 |
| 2011/0106929 A1* | 5/2011 | Lee | ...... | G06F 9/45533 |
| | | | | 709/223 |

FOREIGN PATENT DOCUMENTS

EP       1117049 A1 *   7/2001   ............. G06F 9/541

* cited by examiner

*Primary Examiner* — Tauqir Hussain

(57) ABSTRACT

An apparatus and method of adding thin client functionality are disclosed. One example method provides generating a call function directed to an electronic device and at least one peripheral device. The method also includes redirecting the call function to an auxiliary device, extracting payload data from information sent to the at least one peripheral device, discarding values outside a previously negotiated range from the extracted payload data, performing at least one of incrementing and decrementing the remaining values of the payload data to create a data subset, and redirecting the data subset to at least one other peripheral device resulting in output information being sent to the at least one other peripheral device.

20 Claims, 16 Drawing Sheets

US 10,447,821 B1

METHOD AND APPARATUS OF PROVIDING THIN CLIENT FUNCTIONALITY

CROSS-REFERENCE TO RELATED APPLICATIONS

This application is a continuation of application Ser. No. 15/097,817, entitled METHOD AND APPARATUS OF PROVIDING THIN CLIENT FUNCTIONALITY, filed on Apr. 13, 2016, now issued U.S. Pat. No. 9,923,994, issued on Mar. 20, 2018, which is a continuation of application Ser. No. 13/796,443, entitled METHOD AND APPARATUS OF PROVIDING THIN CLIENT FUNCTIONALITY, filed on Mar. 12, 2013, now issued U.S. Pat. No. 9,325,559, issued on Apr. 26, 2016, the entire contents are hereby incorporated by reference.

TECHNICAL FIELD OF THE INVENTION

This invention generally relates to communication networks, and more particularly to routing, processing and output of received data to peripheral devices as well as to looping-in and embedding of processed input information into data designated for a remote electronic device.

BACKGROUND OF THE INVENTION

By definition, a thin client is a computer and/or a computer program which depends on a remote computer and/or server, to fulfill traditional computational roles. In contrast, a fat client is a computer designated to provide such roles by itself. The exact roles conducted by a server may vary, for example, from providing data persistence for diskless clients to actual information processing on the client's behalf.

A thin client may also be recognized as a component of a broader computer infrastructure, such as, multiple thin clients sharing their computations with a single server. In this example, a thin client infrastructure can be seen as the amortization of a computing service across several user-interfaces. A thin client architecture may be desirable in situations where an individual fat client has much more functionality or power than its current infrastructure requires or uses.

Thin client architectures may be contrasted, for example, with grid computing. The most common type of modern thin client is a low-end computer terminal (dumb terminal) which concentrates solely on providing a graphical user interface to the end-user. The remaining functionality, in particular the operating system, is provided by the server. Historically, thin clients have their roots in multi-user systems, traditionally mainframes accessed by some sort of input/output terminal. As computer graphics matured, these text-based terminals transitioned from providing a command-line interface to a full graphical user interface, which is common on modern thin clients.

One example multi-user environment was UNIX, and fully graphical "X" terminals were relatively popular thin clients in the 1990s. Modern UNIX derivatives, such as, Berkley software distribution (BSD) and "not UNIX" (GNU)/Linux continue this multi-user tradition. Windows NT® is also capable of multi-user operations by implementation of the Citrix multi-user operating system WinFrame® into Windows NT 4.0® terminal server edition. Windows NT® then became the basis of Windows 2000® and Windows XP®. Today, Windows provides graphical terminal support via its Remote Desktop Services (RDP) component.

The term thin client was coined in 1993 by Oracle® while company founder Larry Ellison was working on the launch of Oracle 7®. At the time, Oracle wished to differentiate their server-oriented software from Microsoft's desktop-oriented products. "Thin client" was then popularized by its frequent use in Ellison's speeches and interviews about Oracle products. Microsoft remote desktop protocol (RDP) is used for communication between a server (terminal server) and a client (terminal server client). This Protocol is based on, and is an extension of, the T-120 family of protocol standards.

A multichannel capable protocol allows for separate virtual channels for carrying data. In Windows terminal server, the developers concentrated on providing reliable and fast point-to-point (single-session) communications. Only one data channel was used in this product. By implementing RDP for connectivity purposes within Windows NT terminal server, the ability to provide a large number of separate channels for data transmission was added. However, current transmission activities with this protocol are only using a single channel for keyboard, mouse, and video data. Even the product itself claims to be designed to support many different types of network topologies, however, it is only required to run over TCP/IP.

The activity involved in sending and receiving data through the RDP stack is essentially the same as the seven-layer OSI model standard for common LAN networking. In operation, data from an application or service to be transmitted is passed down through the OSI protocol stacks, sectioned, directed to a channel, encrypted, wrapped, framed, packaged onto the network protocol, and finally addressed and sent to the client. The returned data works the same way only in reverse.

Key portions of the protocol stack modifications occur between the fourth and seventh layers of the OSI model standard. By introducing an additional protocol stack this method has abstracted away the complexities of dealing with known protocol stacks. Although this approach provides thin client functionality for a wide range of compatible devices, introducing additional protocols or layers to the seven-layer OSI model standard requires these additional layers to be available at the client end. These layers require an operating system, BIOS, disk and registry. Although this technique provides an "easy to apply" way to add thin client functionality to computer systems connected to a packet-oriented network, certain devices, such as, cell phones, do not have a separate data transmission channel and/or do not have access to these types of transmission services.

SUMMARY OF THE INVENTION

Example embodiments of the present invention relate to routing, processing and output of received data to peripheral devices as well as to looping-in and embedding of processed input information into data designated for a remote electronic device.

In one example embodiment, a method of adding thin client functionality for reception of information to an electronic device is disclosed. The method may include receiving information directed to the electronic device and at least one peripheral device by an auxiliary process or device and extracting a subset of data from a duplicate of the information. The method may also include discarding values outside a previously negotiated range from the duplicated data, processing the remaining values in various ways to create a data subset, and directing the data subset to at least one other peripheral device resulting in output information being sent to the at least one other peripheral device. Additional operations may include looping-in and identifiable embedding of input data, from a local electronic device designated for operation of a specific peripheral device attached to a remote electronic device, into data designated for transmission to another peripheral device of the remote electronic device.

Another example embodiment of the present invention may include an electronic device configured to add thin client functionality for reception of information. The electronic device includes a processor configured to receive information directed to the electronic device and at least one peripheral device by an auxiliary process or device and extract a previously negotiated subset of data from a duplicate of the information sent to the at least one peripheral device, processing the remaining values in various ways to create a data subset. The electronic device may also include a transmitter configured to direct the subset data to at least one other peripheral device resulting in output information being sent to the at least one other peripheral device.

Ideally, transparent communications stacks would be maintained from a first electronic communications device, across a network, and through peripheral devices at a remote site provided by a remote electronic device. A local electronic device, such as, a computer system should be capable of targeting and communicating with specific peripheral devices of a remote device by utilizing the data format and communication protocol (if any) provided by the remote device.

Example embodiments of the invention allow control of peripheral devices of remote electronic devices in a manner that is independent of higher level, additional and/or expensive communication protocols. The present invention may also allow targeted communications with specific peripheral devices at the remote device by utilizing data formats and communication protocols (if any) provided by the remote device.

DETAILED DESCRIPTION OF THE INVENTION

It will be readily understood that the components of the present invention, as generally described and illustrated in the figures herein, may be arranged and designed in a wide variety of different configurations. Thus, the following detailed description of the embodiments of a method, apparatus, and system, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present invention. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present invention, the invention may be applied to many types of network data, such as packet, frame, datagram, etc. For purposes of this invention, the term "message" also includes packet, frame, datagram, and any equivalents thereof. Furthermore, while certain types of messages and signaling are depicted in exemplary embodiments of the invention, the invention is not limited to a certain type of message, and the invention is not limited to a certain type of signaling.

A specific peripheral device of a local electronic device can be targeted and controlled by data received from a remote electronic device regardless of the data format, corresponding protocol and the connection type of the devices. The specific peripheral device can be operated by utilizing a processed subset of received payload data designated for another peripheral device. Input data designated for the operation of a specific peripheral device at a remote electronic device can be embedded into data designated for transmission to another peripheral device of the remote electronic device.

Example embodiments of the present invention permit the control of peripheral devices of remote electronic devices in a manner that requires no higher level, additional or expensive communication protocols. Other examples also allow the targeting and communication with specific peripheral devices at the remote device by utilizing data formats and communication protocols (if any) provided by the remote device.

Figure 1:
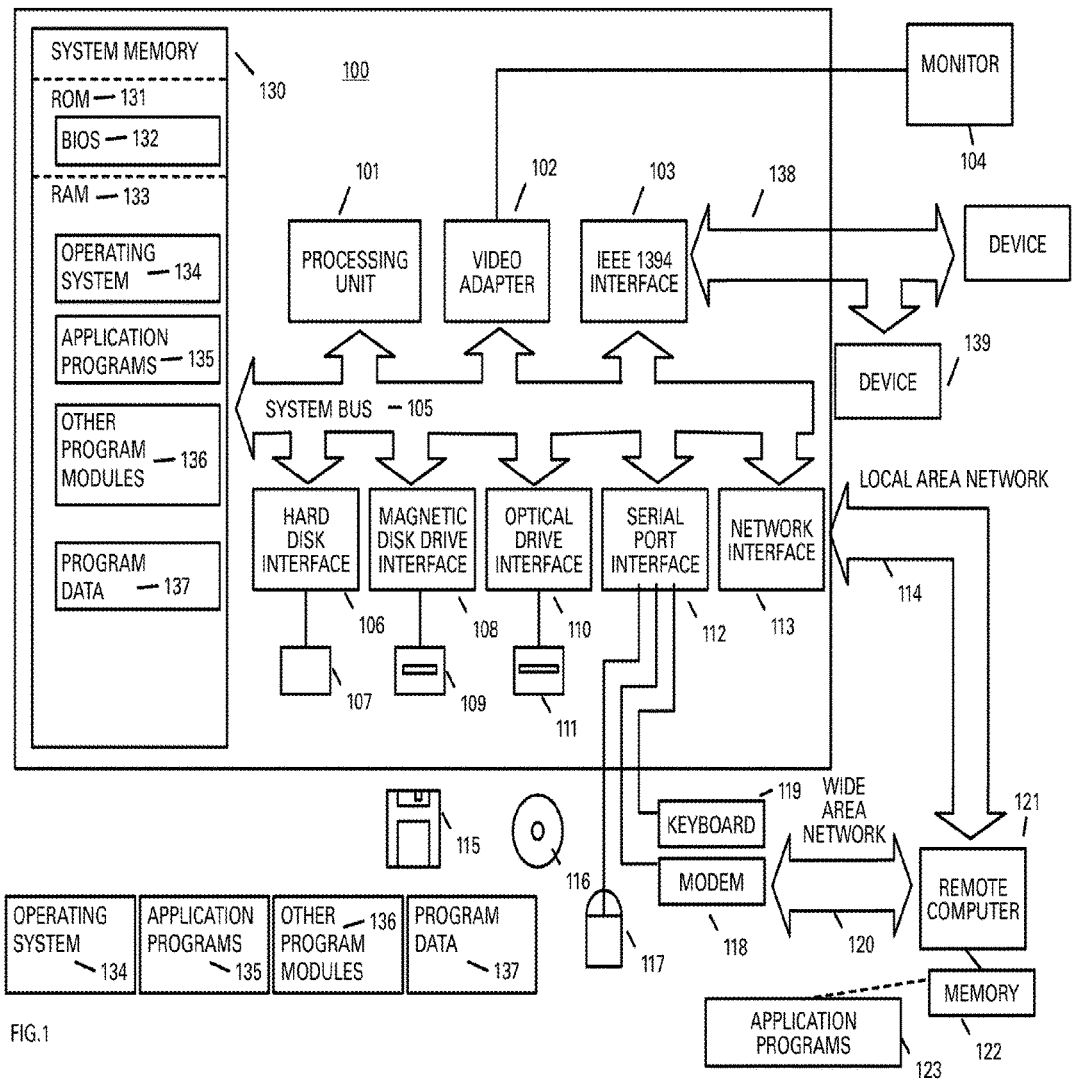
FIG. 1 is a block diagram of an exemplary operating environment of a host computer system, according to example embodiments of the present invention.

FIG. 1 illustrates an example schematic diagram of a computer system, according to example embodiments of the present invention. Referring to FIG. 1, the computer system 100 includes a processing unit 101, a system memory 130 and a system bus 105 that couples various system components including the system memory to the processing unit 101. The system bus 105 may be any of several types of bus structures including a memory bus or memory controller, a peripheral bus, and a local bus using any of a variety of bus architectures. System memory 130 includes a read only memory (ROM) 131 and a random access memory (RAM) 133. A basic input/output system (BIOS) 132 containing the routines that help transfer information between elements within the computer system, such as during start-up, is stored in ROM 131.

The computer system 100 also includes a hard disk drive 107 for reading from and writing to a hard disk, an optical disk drive 111 for reading from or writing to a removable optical disk 116, such as, a CD-ROM or other optical media and a magnetic disk drive 109 for reading from or writing to a removable magnetic disk 115. The magnetic disk drive 109, hard disk drive 107 and the optical disk drive 116 are respectively connected to the system bus 105 by a magnetic disk drive interface 108, a hard disk drive interface 106 and an optical disk drive interface 111 to an optical drive interface 110. The drives and their associated media provide non-volatile storage of electronic devices, readable instructions, data structures, program modules and other data for the computer system. Other types of media readable by electronic devices, which can store data that is accessible by an electronic device, such as, flash memory cards, digital video disks, magnetic cassettes, random access memories (RAMs), read only memories (ROMs), and the like, may also be used in the exemplary environment.

A number of program modules can be stored on the hard disk 107, magnetic disk 115, optical disk 116, ROM 131 or RAM 133, including an operating system 134, one or more application programs 135, other program modules 136, and program data 137. A user can enter commands and information into the computer system through input or selection devices, such as, a keyboard 119 and a pointing device 117. The pointing device 117 may comprise a mouse, touch pad, touch screen, voice control and activation or other similar devices. These and other input devices are often connected to the processing unit 101 through a serial port interface 112 that is coupled to the system bus, but may be connected by other interfaces, such as a parallel port or a universal serial bus (USB).

A monitor 104 or other type of display device is also connected to system bus 105 via an interface, such as, a video adapter 102. In addition to the monitor, computer systems typically include other peripheral output devices (not shown), such as speakers and microphones. In context with the present invention the computer system operates in a networked environment using logical connections to one or more remote electronic devices, such as, remote electronic computer device 121. The electronic device 121 may have an IEEE 1394 interface 103 to connect peripheral devices 139 via a peripheral bus 138. Such device typically includes at least some of the elements described above relative to the computer system, although only a memory storage device 122 has been illustrated in FIG. 1. The memory storage device 122 is coupled to application programs 123.

The logical connections depicted in FIG. 1 include a local area network (LAN) 114 and a wide area network (WAN) 120. Such networking environments are commonplace in offices, enterprise-wide computer networks, intranets and the Internet. When used in a LAN networking environment, the computer system 100 is connected to a local network 114 through a network interface or adapter 113. When used in a WAN networking environment, local computer system and remote electronic device may both include a modem 118 or other communication interface used to establish communications over a WAN 120, such as, the Internet.

Modem 118, which may be internal or external, is connected to system bus 105 via serial port interface 112. In a networked environment, program modules relative to the computer system may be stored in the remote memory storage device. It will be appreciated that the network connections illustrated in FIG. 1, are exemplary and other variations of establishing a communications link between the computer system and the remote electronic device can be used. Furthermore, the existence of any of various well-known protocols, such as TCP/IP, "ETHERNET", FTP, HTTP and the like, are presumed, and the system can be operated in a client-server configuration to permit retrieval of web pages from a web-based server. For example, according to example embodiments of the present invention, the computer system may be a server equipped with peripheral devices that may be targeted and accessed by the remote electronic device. Example embodiments of the present invention described throughout the specification may operate within the environment of the computer system illustrated in FIG. 1.

Figure 2:
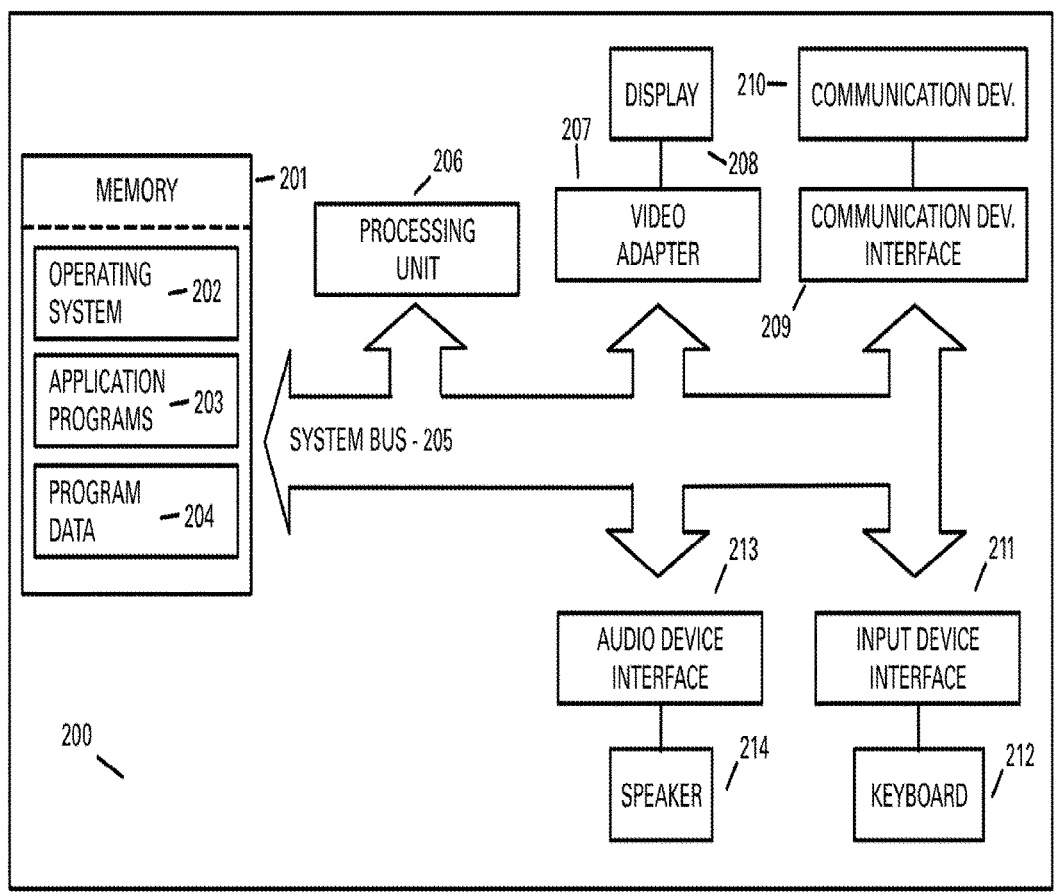
FIG. 2 is a block diagram of an exemplary operating environment of a device that acts as a thin client, according to example embodiments of the present invention.

FIG. 2 is a schematic diagram of an electronic device that can be used to implement various aspects of the client side functionality, according to example embodiments of the present invention. The electronic device 200 may include a processing unit 206, memory 201 and a system bus 205 that couples various system components including the device memory to the processing unit 206. Similar to the computer system, the electronic device's system bus may be any of several types of bus structures. The device memory 201 provides storage of readable and executable instructions, data structures, program modules and other data for the electronic device 200, such as, the operating system 202, application programs 203 and program data 204.

The electronic device also includes several peripheral devices, such as, a speaker 214, a keyboard 212, a communication device 210 and a display 208. The peripheral devices are connected to the system bus 205 by an audio device interface 213, an input device interface 211, a communication device interface 209 and a video adapter 207. A user can enter commands and information into the electronic device through input or selection devices, such as, a keyboard 212. A display device 208 is also connected to system bus 205 via an interface, such as, a video adapter 207.

According to other example embodiments of the present invention, the electronic device operates in a networked environment using logical and/or physical connections to one or more remote computer systems as illustrated in FIG. 1. Although the present invention operates in accordance with electronic devices connected to computer systems, the present invention is also applicable to any electronic device that has at least one peripheral output device and is able to use a point-to-point connection to another remote device.

Figure 10:
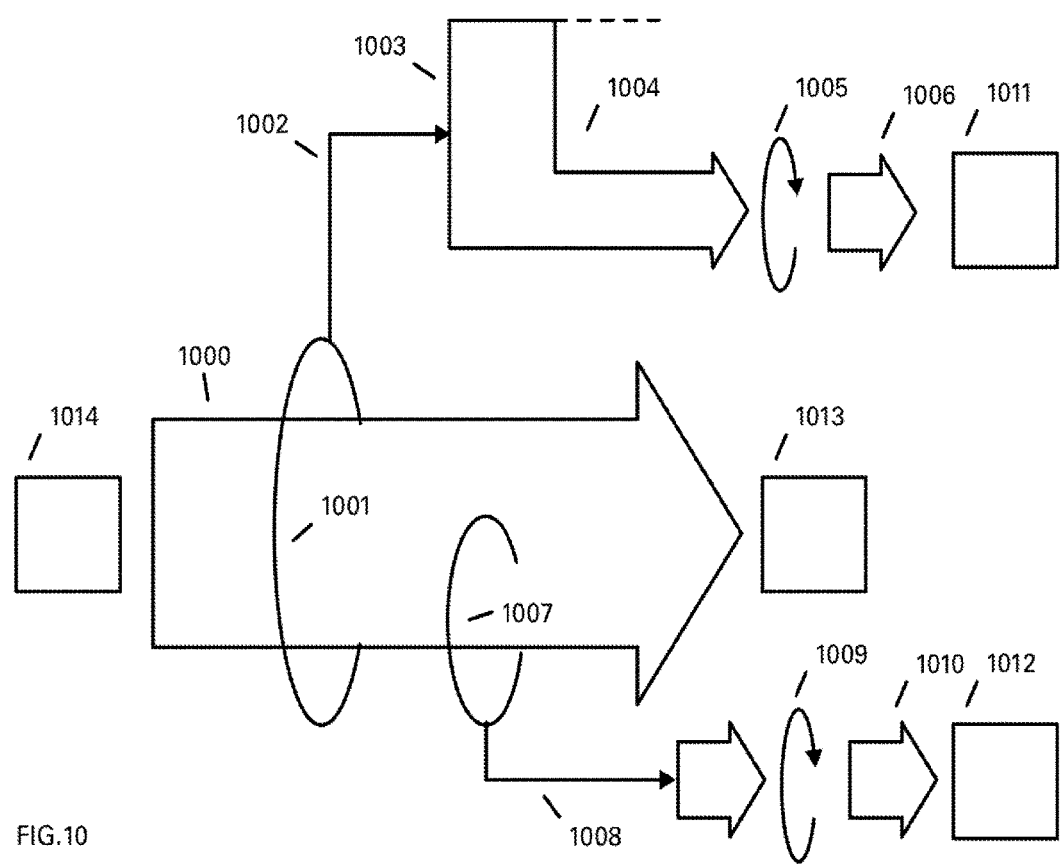
FIG. 10 is a block diagram showing involved devices and performed processing steps when handling incoming data on a device in accordance with example embodiments of the invention.

Example embodiments of the present invention may include adding thin client functionality to such electronic devices regardless of the hardware and software capabilities, the operating system being used, and, in particular, the connection type of the electronic devices. In one example, as shown in FIG. 10 all data 1000 sent from peripheral device A 1014 to peripheral device B 1013 may be duplicated 1001 and sent 1002 to an auxiliary process or device. Values outside a previously negotiated range 1004 of the duplicated data 1003 is discarded. The remaining data is processed 1005 and transmitted 1006 to device C 1011. If applicable, only a previously negotiated subset of the data 1000 sent from peripheral device A 1014 to peripheral device B may be duplicated 1007, sent 1008 to an auxiliary process or device, processed 1009 and transmitted 1010 to device D 1012.

For negotiation of the range of values to be used one of the participating devices (e.g. "Device A") may send a message to a primary target device (e.g. "Device B") that contains at least a message identifier and a desired range with minimum and maximum payload data values for transmission of data to an additional target (e.g. "Device C"). In case the range values are entered manually or are taken from a setup file the process of range negotiation may also be performed independently on each of the participating devices. Other variants such as messages that sole contain a message identifier and either a minimum or a maximum value or, in case of multiple possible targets, additionally contain information that allows identification of the desired target device may also be used. The identifier may be a sequence of bits that indicates range negotiation and the message type which may be a full or partial force, suggest, deny or match message. Dependent on the type of message various actions and responses are possible. In case device B device receives a "full force" message from device A device B simply uses the suggested range for transmission of data to device C. If device B receives a partial force message from device A it either adjusts the minimum or maximum value for transmission of data to device C without responding to device A. In case device B receives a message from device A of type "full suggest" it initially tries to use both, the received minimum and maximum values for transmission of data to device C. If one or all of the suggested values cannot be used, for example due to violation of a reserved area, device B may respond with a "Range +", "Range −", "Full-Deny" or "Partial-Deny" message. Reception of such type of message initiates retransmission of a full- or partial-suggest message from device A to device B with fully or partially adjusted minimum and/or maximum values that again may lead to a response message from device B which, in case of success, may also be a "Match" message. The process of range negotiation may be initiated and influenced by various factors. In case of a static setup range negotiation may be performed once upon startup of the device or before every attempt to transmit data to the remote device. Range negotiation may also be initiated periodically and be based on and influenced by analysis of the whole range of transmitted or received payload data values. If, for example, most of the whole available range of payload data is unused for a specific duration, device A could send a suggest message to device B and propose an extension of the range for transmission to device C or, in case a specific range of the available payload data was not used for a specific duration, device A could suggest to shift the transmission range for device C into this area. Usage of such techniques results in building up and influencing a dynamic range for data transmission to device C. Also values for a suggest message may be built and retrieved in various ways. Initial values can be taken from the device, user input or a setup file whereas values for adjustment of an initially suggested range can be taken from analyzing the utilization of the whole range of available payload data.

Alternatively when transmitting data from device A 1014 to device B 1013, a service routine for writing to the specific peripheral output device B 1013 may be called. The call itself may be redirected to an auxiliary process or device, which processes the data designated for the peripheral device C 1011, while preserving the attributes of the original call. Once the processing is finished, an original function pointer may be called.

Figure 13:
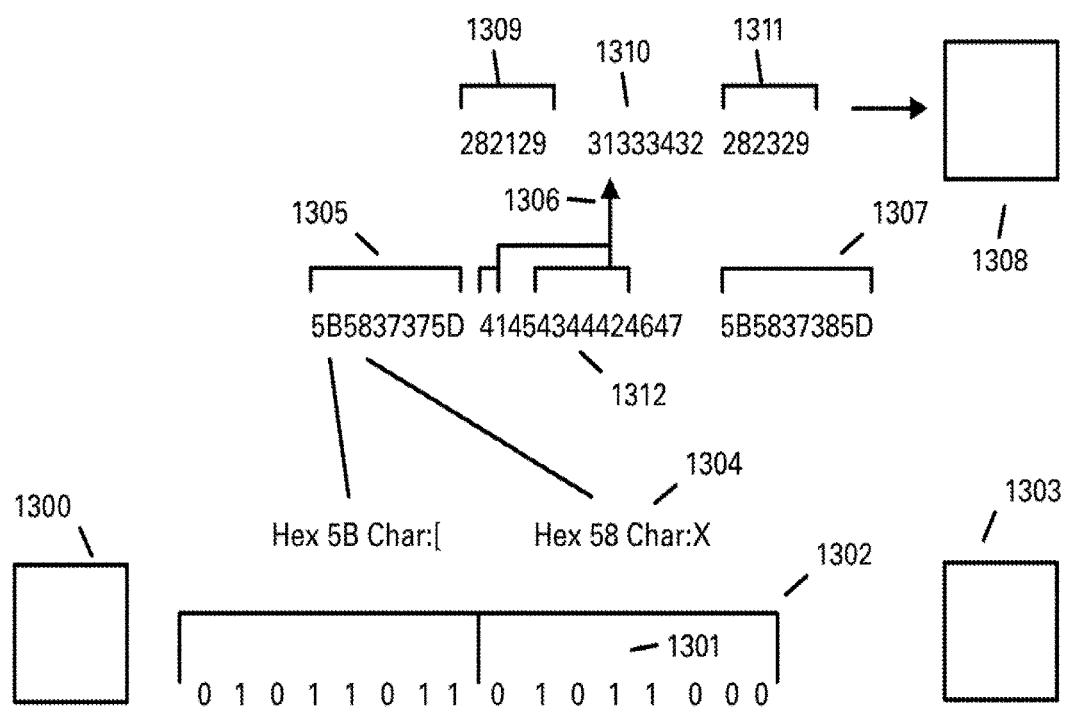
In FIG. 13 a block diagram is shown illustrating a method for processing, translation and transmission of data to an alternate target according to example embodiments of the invention.

FIG. 13 is a block diagram showing a method for processing, translating and transmission of data to an alternate target. Sequences 1302 of binary values 1301 as illustrated in FIG. 13 can be interpreted as a hexadecimal character 1304 which may represent an ASCII character. In packet oriented transmission, a specific character or a character sequence is interpreted as protocol header 1305 or trailer 1307 enveloping payload data 1312. Instead of simply outputting the intercepted data to a file or a service payload, a subset of data is extracted by stripping information other than payload data (such as protocol, packet or transfer unit header and trailer) from the packet or data chunk message. A first rule looks for a matching header sequence. Data following this sequence is treated as payload data and processed by a second rule until a matching trailer sequence is found. Values outside a previously negotiated range may be discarded, and the remaining values may be processed in various ways (e.g. incremented, decremented, counted or combined) to fit into a range of payload data expected by a secondary peripheral device, such as, a video peripheral device. For example, values within a specific range (e.g. 41 h-44 h) 1306 are translated (e.g. −Ah) 1310 according to the expectations of device C 1308, optionally enclosed in a new header 1309 and trailer 1311 sequence and sent to device C 1308. The given range can be statically determined by read parameters describing the characteristics of the device A 1300 and/or device B 1303 (e.g. digital value of the tone frequency) and/or by user specified setup of parameters for the auxiliary process device. Alternatively the given range may be dynamically determined based on the result of a range negotiation process between the participating devices.

In addition to other device-specific features, processing may be performed by the device. Processing of values which results in spreading of values across a range can be performed according to the expectations of the target device and/or by an algorithm defined in the auxiliary process of the device. If the determined value range is too narrow to build an understandable output based on incoming values, other additional information, such as, the count of specific values received, can be used to build the output. A system call may be made by the auxiliary process of the device to a function for a secondary peripheral output device. Transmission of the processed subset of payload data may result in outputted data at the secondary peripheral device.

Figure 3:
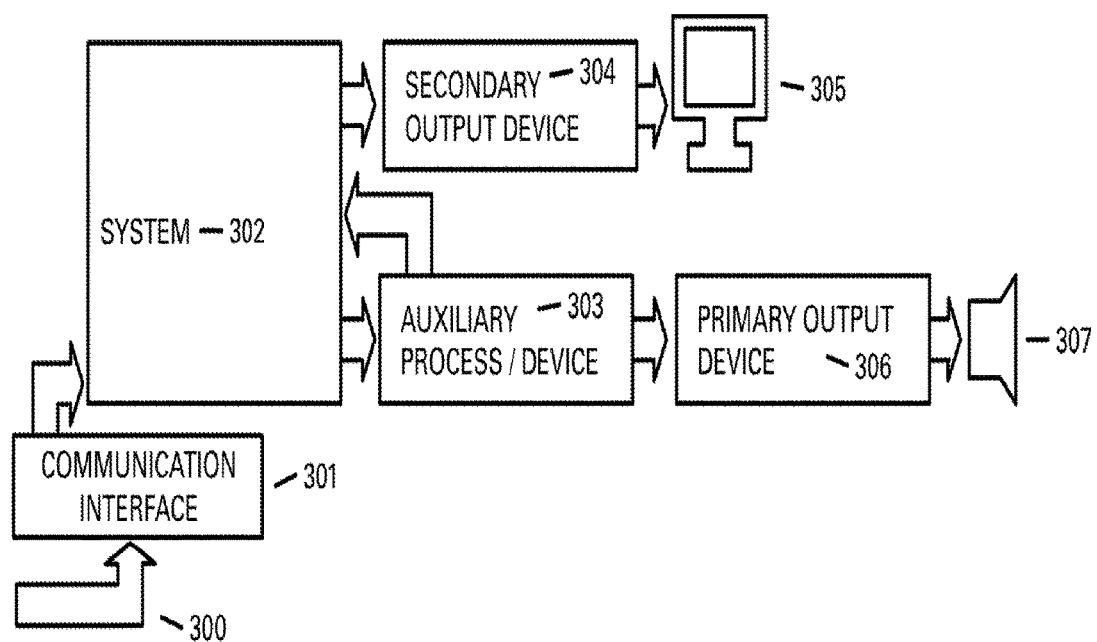
FIG. 3 is a block diagram of a system receiving data from a computer system on a thin client, according to example embodiments of the present invention.
Figure 5:
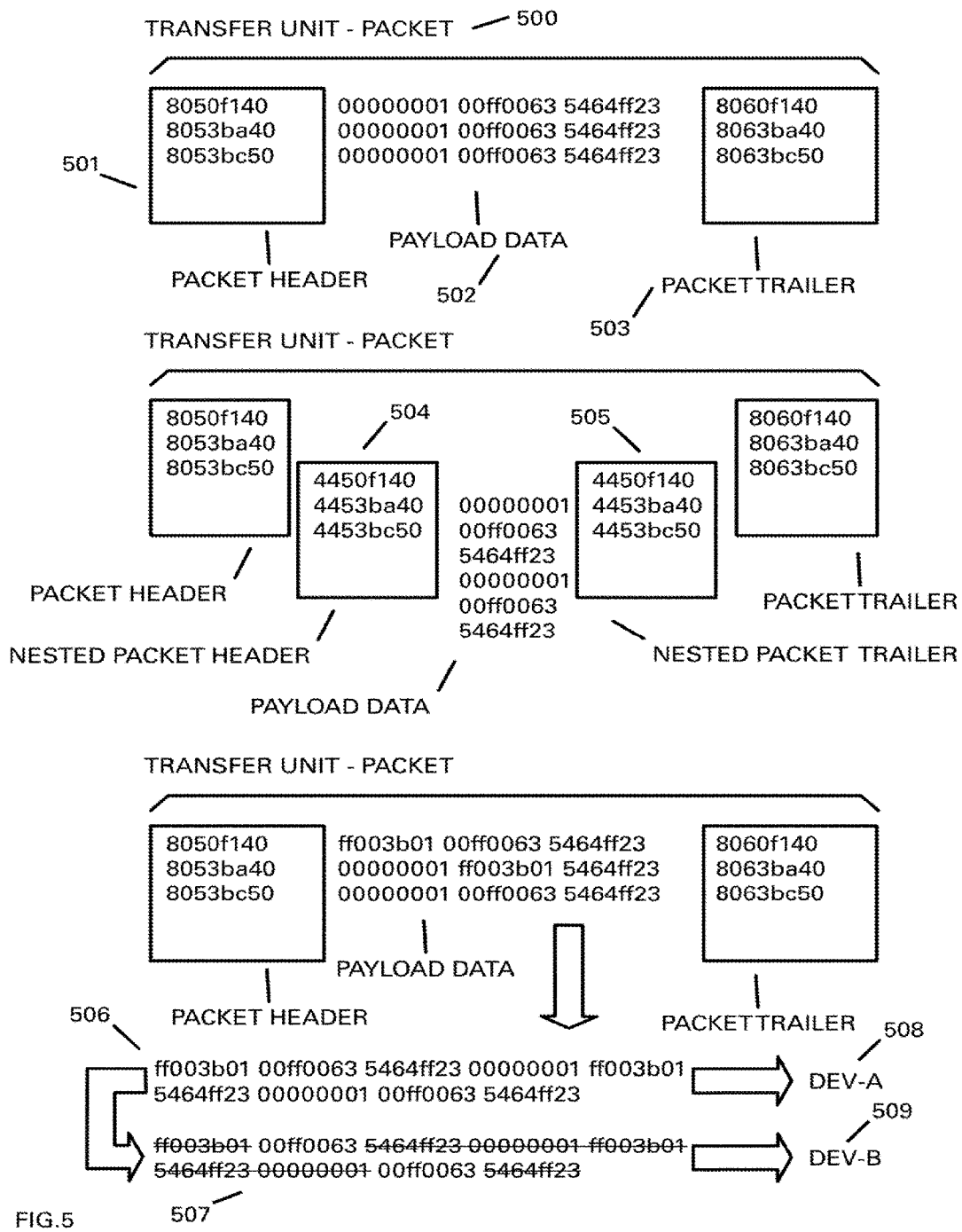
FIG. 5 is a flow chart illustrating methods of transmission of nested packets and processing intercepted data on a thin client in accordance with example embodiments of the present invention.

FIG. 3 is a block diagram of a system for reception of data from a computer system on a thin client, according to example embodiments of the present invention. The device receives data 300 via its communication interface 301 in a specific format. In packet-oriented networks this specific format is defined by the content of a packet header 501 of a transfer unit packet 500, as illustrated in FIG. 5. The packet itself includes a packet header, payload data 502 and a packet trailer 503. The size of a transfer unit largely varies dependent on the type of network. In cellular networks, a transfer unit may be as small as a few bits, and in a local area network (LAN) message sizes up to one megabyte and more are common. In non-packet-oriented networks, such as, analog and optical communication lines, the frequency of incoming signals or a descriptive electrical pulse sequence may be used to detect a format and a desired target of transferred data.

FIG. 5 further illustrates a nested packet header 504 and a nested packet trailer 505 as part of the transfer unit packet 500. Certain information 506 may be sent to device A 508. A modified version of that information 507 may be sent to a different device B 509.

Referring again to FIG. 3, given the format and target detected by the device (e.g. a protocol header that signals audio content), task specific system call service routines may be executed followed by transmission of data to a primary peripheral output device 306 which is connected to a physical device 307 (e.g. speaker). The address of a system call service routine or the target of the call may change and/or may be altered. For example, a call service routine may be changed by changing the address of the routine or the call redirection to an auxiliary process or device 303. The attributes of the original call may continue to be preserved, and the data designated for the primary output device 306 may be processed.

Once the call processing is complete, the original function pointer may be called. Instead of simply outputting intercepted data to a file or a service, payload data is extracted by stripping protocol header information 501 and trailer information 503 from the packet 500 or data message chunk. Values outside a previously negotiated range are discarded and the remaining values are processed in various ways (e.g. incremented, decremented, counted or combined) to fit into a range of payload data expected by a secondary peripheral device 304 (e.g. video), which is in communication with a display device 305.

The range can be statically determined by read parameters that describe the characteristics of the device (e.g. digital value of the tone frequency) and/or by user specific parameters setup for the auxiliary process/device. Alternatively the given range may be dynamically determined based on the result of a range negotiation process between the participating devices. Processing or spreading values across a range can be performed according to expectations of the target device and/or by an algorithm defined in the auxiliary process or device. If the value range is too narrow to build understandable output based on incoming values, additional information, such as, the count of specific values received can be taken into account to build output information. A system call may be made by the auxiliary process/device to a function for a secondary peripheral output device. Transmission of the remaining processed payload data to the system 302 may result in output of data at the secondary peripheral device 304.

Figure 9:
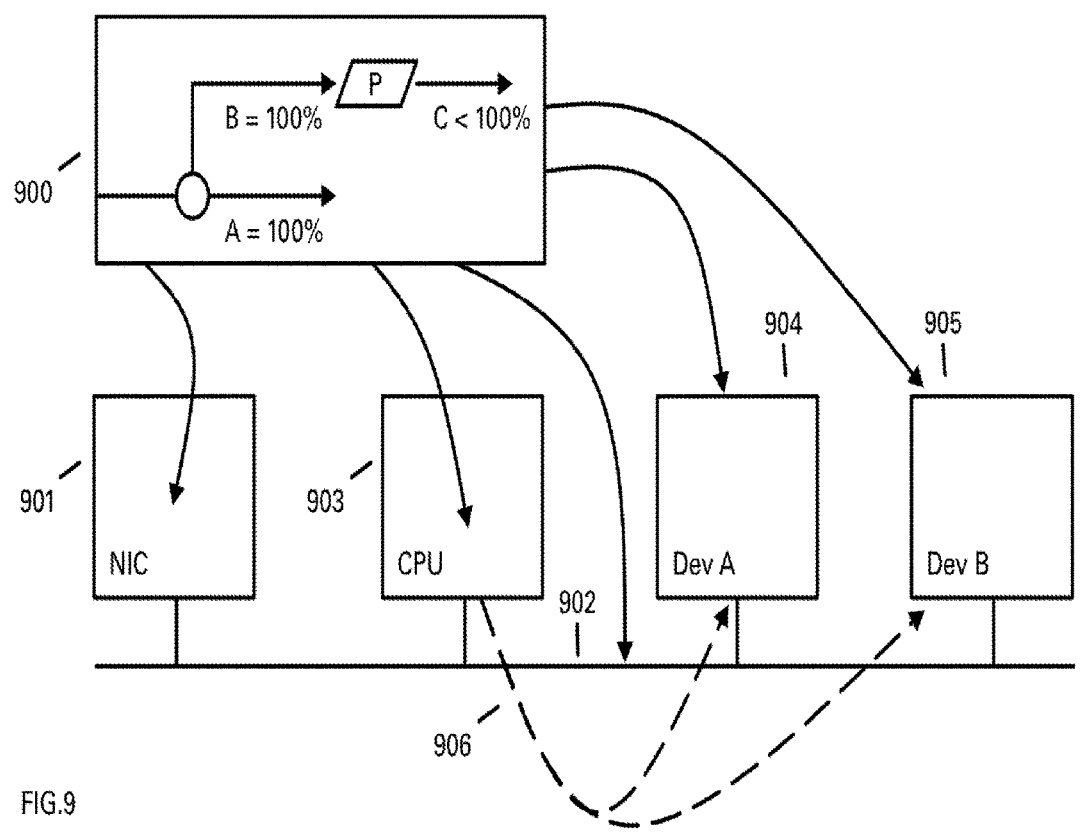
FIG. 9 is a block diagram showing various possible locations for placement of the auxiliary process/device according to example embodiments of the invention.

As shown in FIG. 9 an auxiliary process/device 900 that duplicates received information for target A 904 may be placed at various locations. The duplicated information B still contains 100% of the input. After destructive processing P output C contains less information than the initial input. Processing 900 may take place in the communication device 901, on the system bus 902, as a result 906 of an operation where CPU 903 is involved, at device A 904 or even at device B 905 (if reachable by the initial information) which would use output C and redirect output A. Processing 900 can be performed by a hooking software component or an electronic assembly.

Figure 7:
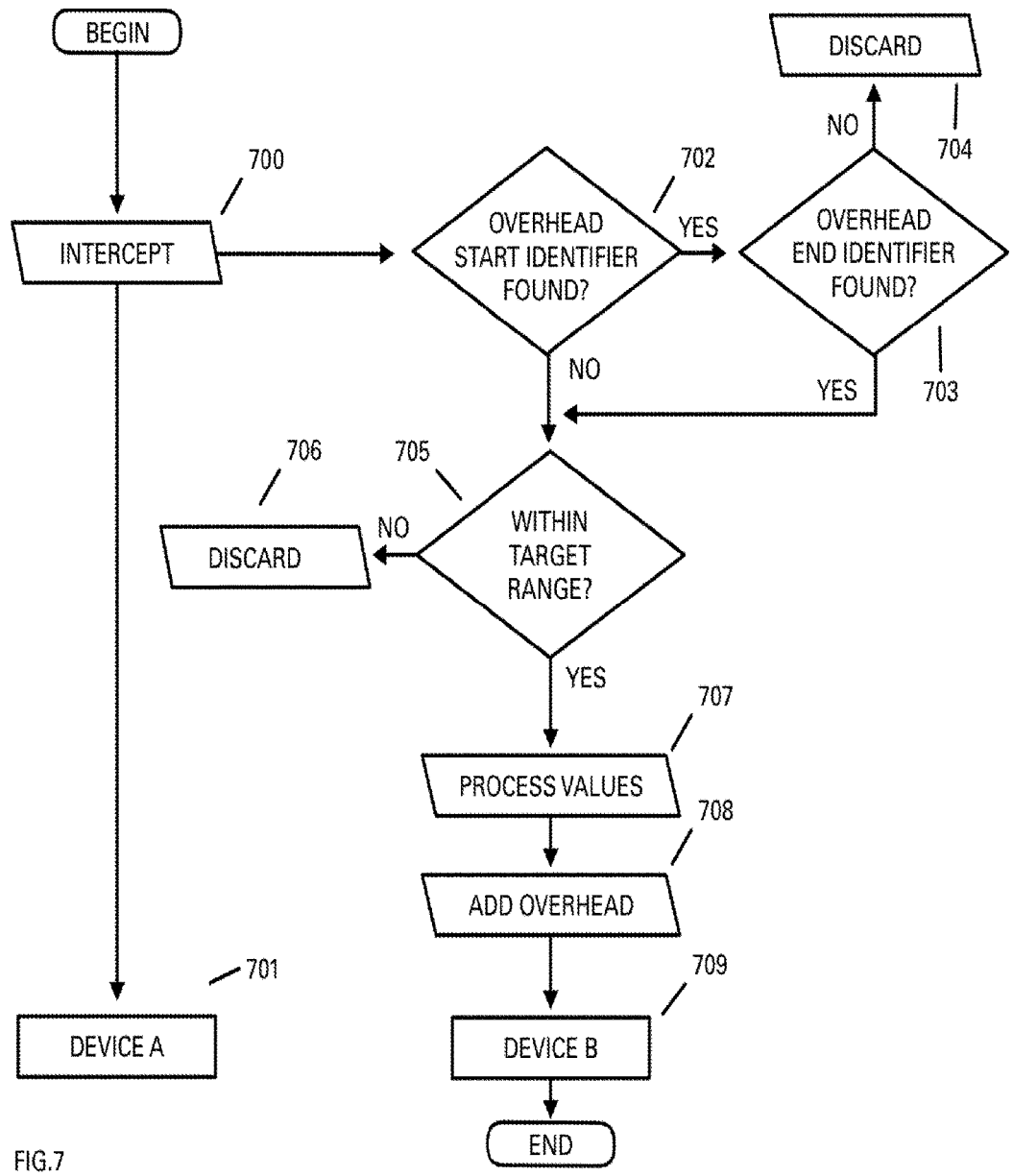
FIG. 7 is a flow chart illustrating a method of processing incoming data on a thin client in accordance with the present invention.

FIG. 7 illustrates a flow chart for processing incoming data on an electronic device, according to example embodiments of the invention. Referring to FIG. 7, information targeted to device A 701 may be intercepted at operation 700. Although the interception technique may be based on simultaneous transmission and processing of data to more than one device, other variants may include, redirection of the original system call, processing and transmission of the data to device B 709 and execution of the preserved original system call for device A 701 can also be implemented by one skilled in the art.

In packet oriented transmission techniques, the intercepted information may contain protocol and/or device specific header and/or trailer (overhead) information. If an identifier indicates the beginning of such overhead data is discovered at operation 702, then subsequent information is discarded at operation 704 until occurrence of an identifier 703 indicates the end of the protocol header and/or trailer.

Depending on the type of protocol, the form and length of identifiers may vary from a combination of single bits up to complete chains of bits, bytes and characters. If the entire protocol header and/or trailer is derived from a combination of single bits, a byte, and/or a character chain, then the overhead may already be discarded in operation 702. Stripping the protocol overhead from the data results in payload data designated for device A. Since the remaining data contains the useable range of payload data for device A 701, and a subset of this data may be utilized for device B 709, further processing may be required.

In operation 705 values that are not within the determined target range for device B 709 are discarded at operation 706. The target range of values for a specific device may be defined by a range negotiation process, the replaced function implementation 613 or by parameters provided through user input. A target range usually represents a negligible subset of payload data for device A, such as, values that, for example, in the case of incoming audio data, represent non-audible frequencies above 90 Hz and below 100 Hz. To build understandable payload values for device B, for example, an ASCII character set with 256 values, the initial values are interpreted to fit into the desired range of device B 709 by processing them as illustrated in operation 707.

In case of the above example, a value of 90.000 Hz could be mapped into a hexadecimal value of 00, a value of 90.100 Hz would then represent a hexadecimal value of 01 (start of heading) and continuing onward. If the determined or negotiated range is too narrow for building understandable output then other variants, such as, counting the quantity of single values received within a cycle, or, a number of cycles, can be implemented by one skilled in the art.

For specific scenarios, such as direct output of incoming ASCII values to an audio device component, it may be necessary to add protocol overhead to the results of each reading cycle to produce auditable output as illustrated in operation 708, although, a static header/trailer sequence may be sufficient in this example. If the replaced function implementation 613 creates a system call, operation 708 can be omitted.

Figure 6:
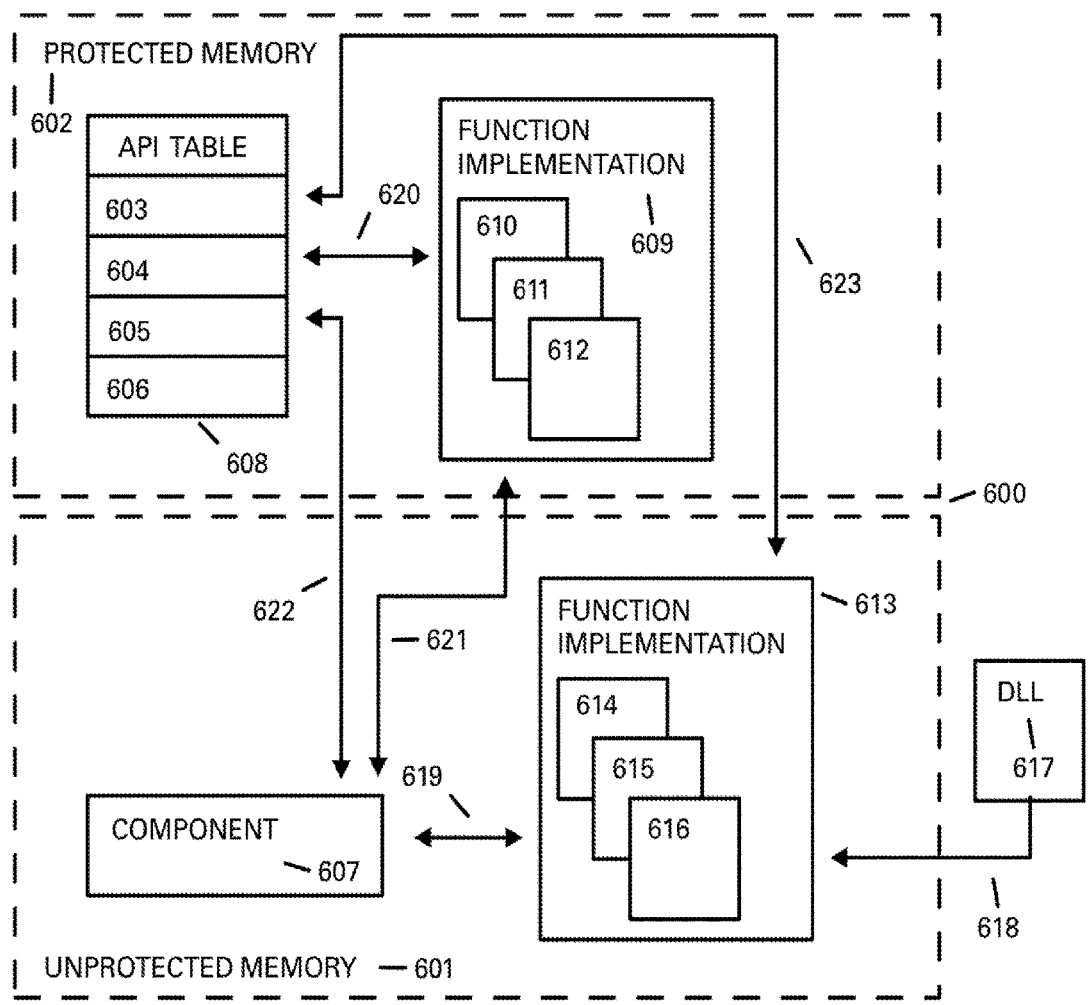
FIG. 6 shows a diagram of a system that illustrates various methods for hooking, altering and replacement of API functions and call of these functions as utilized by the present invention.

FIG. 6 illustrates a diagram of a system 600, according to example embodiments of the present invention. Referring to FIG. 6, various methods for hooking, altering and replacing application programming interface (API) functions, and calling such functions are illustrated. The system is divided into unprotected memory 601 (known in the art also as "user mode memory") and protected memory 602, (also known as "protected mode memory"). Within the protected memory 602 is an application program interface (API) table 608 which has a number of entries 603, 604, 605 and 606. Each of those entries has a pointer to a corresponding function, either to an existing function 609 or to a replacement implementation of an API function 613. Due to restrictions, replacement function implementations usually reside in the unprotected memory 601 but replacement function implementations in protected mode are also known and may be used in embodiments of the present invention.

For example, by using a disassembler, the entry point of a function within a module can be found. It can then be altered to instead dynamically load some other library module and then execute desired methods within that loaded library. If applicable, another approach by which usage of replacement function implementations can be enforced is by altering the import table of an executable. This table can be modified to load any additional library modules as well as changing what external code is invoked when a function is called by the application.

An alternate method may include intercepting function calls through a wrapper library. When creating a wrapper library, a version of an existing library with all the same functionally of the original library may be loaded by an application. In this case, all the functions that are accessible are essentially the same between the original and the replacement libraries. Such wrapper library can be designed to call any of the functionality from the original library, or, replace it with an entirely new set of logic.

Replacement function implementation 613 includes replacement function implementations 614, 615 and 616 of which one or more of the entries 603, 604, 605 and 606 point to the implementation, as indicated by the line 623. The existing implementations reside in existing function implementation 609 in the protected memory. For example, existing function implementation 609 includes a number of existing function implementations 610, 611 and 612, such that one or more of the entries 603, 604, 605 or 606 point to the implementation, as indicated by the line 620.

According to one example embodiment, the API table is altered to have one or more of its entries point to the replacement function implementations. The replacement functions can add one or more of pre-processing functionality to the original existing functions, post-processing functionality, and both pre-processing and post-processing functionality, and/or totally replace the original existing functions. For example, one or more of the replacement function implementations can perform some pre-processing, then call the original existing function implementation within the existing function implementations, and perform some post-processing.

According to one example, when a component 607, such as, a computer program, thread, process, etc., requires to call an API function, it references the API function within the API table 608, as referenced by the line 622. Specifically, the component references a particular entry within the API table. The entry points the component to either one of the replacement function implementations 613, or one of the existing function implementations 609. Therefore, the component calls one of the former function implementations, as referenced by the line 619, or one of the latter function implementations, as referenced by the line 621. Without the replacement function implementation 613, all of the pointers within the API table would point to the existing function implementations 609. Because the API table is an altered table that has been modified to have at least some of its entries point to the replacement function implementations 613, the component may end up calling some of these replacement function implementations 613.

Example embodiments of the present invention provide additional operating system functionality without requiring recompiling of certain components and/or adding new API functions. In one embodiment, the replacement function implementations 613 originally reside within a file 617, such as, a dynamically linked library (DLL) file. Replacement function implementations 613 may be added into the API table to point to replacement function implementations 613 as well as existing function implementations 609. Thereafter, when one of the function implementations 613 is first called, the implementations 613 will be loaded into the unprotected memory, which is illustrated by the line 618.

Figure 11:
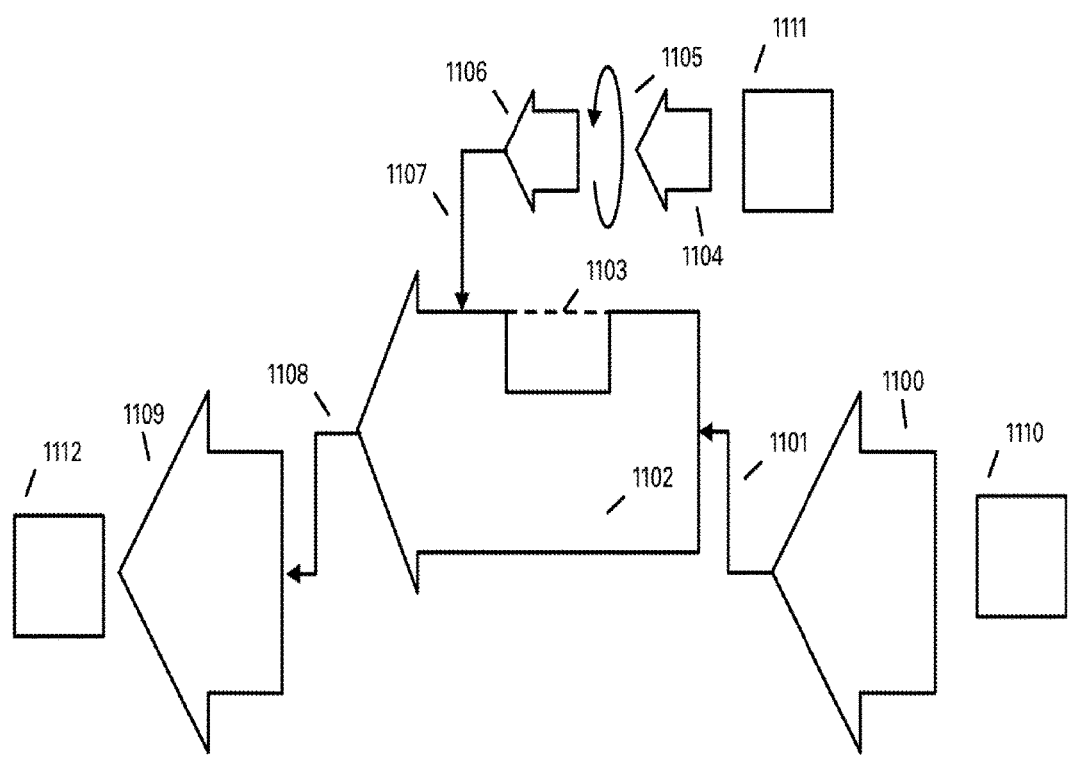
FIG. 11 is a block diagram showing involved devices and performed processing steps when handling outgoing data on a device in accordance with example embodiments of the invention.

FIG. 11 is a block diagram illustrating involved devices and performed processing operations used when handling outgoing data on a device, in accordance with example embodiments of the invention. All data 1100 (message) sent from peripheral device B 1110 to device A 1112 is redirected 1101 to an auxiliary process or device. A statically or dynamically determined range of information 1103 is discarded from the data 1102. Input data 1104 from device C 1111 designated for a peripheral device on a remote electronic device is processed 1105 to fit into the determined range. Processed data 1106 is inserted 1107 into the data 1102, redirected 1108 and sent 1109 to device A 1112 and transmitted to a remote electronic device.

Figure 12:
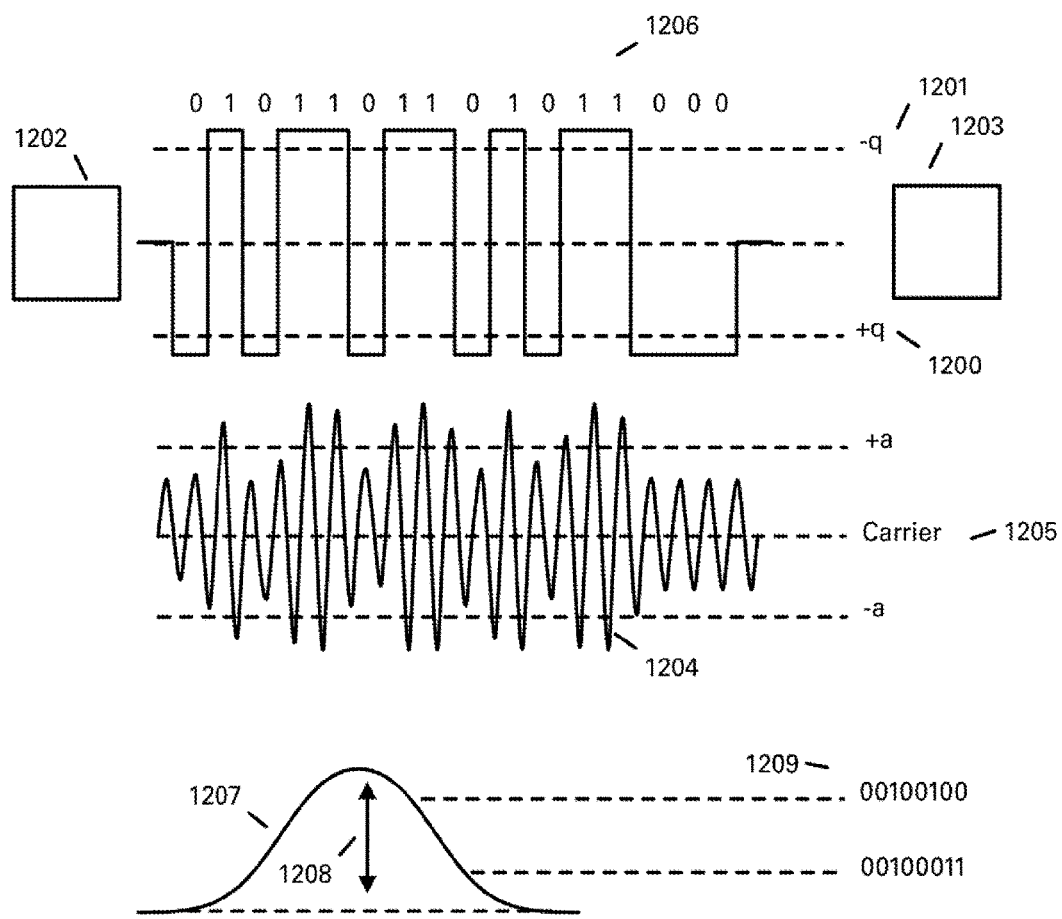
FIG. 12 shows a block diagram illustrating various methods of building binary values or sequences of binary values from interpreted electrical quantities according to example embodiments of the invention.

As illustrated in FIG. 12, the terms "data" and "information" used in the description of embodiments of the present invention should be defined as binary values 0 or 1 (1206) or sequences thereof built as a result of interpretation of sequentially received positive 1200 or negative 1201 amounts of electrical quantities (e.g. voltage) on a transmission line from device A 1202 to device B 1203 exceeding specific values. In a wireless connection modified characteristics (Amplitude 1204, Frequency or Phase) of a sinusoidal carrier 1205 are either interpreted as a binary value 0 or 1 (1206). A specific amount 1208 of an electrical quantity 1207 (e.g. amperage) may be interpreted as a sequence of binary values 1209.

Figure 14:
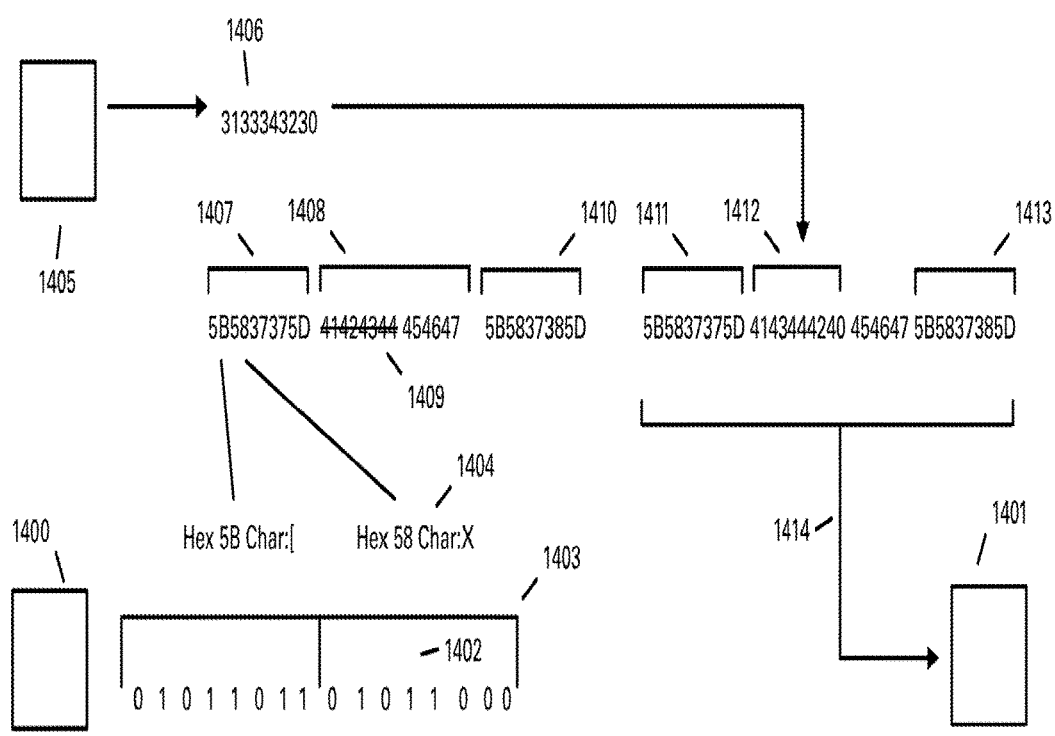
FIG. 14 is a block diagram showing a method for processing, embedding and looping-in of input data into information transmitted by another device according to example embodiments of the invention.

As illustrated in FIG. 14, binary values 1402 constructed according to FIG. 12 are redirected to an auxiliary process when transmitted from device A 1400 to device B 1401, sequences of binary values 1403 can be interpreted as hexadecimal characters 1404. Values 1408 following a specific header sequence 1407 are treated as payload data until a specific trailer sequence 1410 occurs. Payload data values within a specific range 1409 (e.g. 40 h-44 h) are discarded. Input data 1406 from device 1405 is translated (e.g. +Ah) to fit into the specific range of values, inserted 1412 into the payload data section between header sequence 1411 and trailer sequence 1413 and sent 1414 to device B 1401.

When sending information from an electronic device with a single input device (e.g. a keyboard) to more than one specific target on a remote electronic device, two or more filters may be used to act as high, low, and/or bandpass filters. Such filters may be placed between the input device and other components of the system, the second filter may be an inversion of the first. Depending on an occurrence of a switching sequence, incoming information may be processed by either the first or the second filter before data is transmitted to the system. A switching sequence may be a single or a number of characters, which may be placed before each character to be filtered and/or a chain of data, which is then delimited by the switching sequence. As output and input peripheral devices may be targeted by the auxiliary process device, remote control of such thin client devices may also be implemented.

Figure 4:
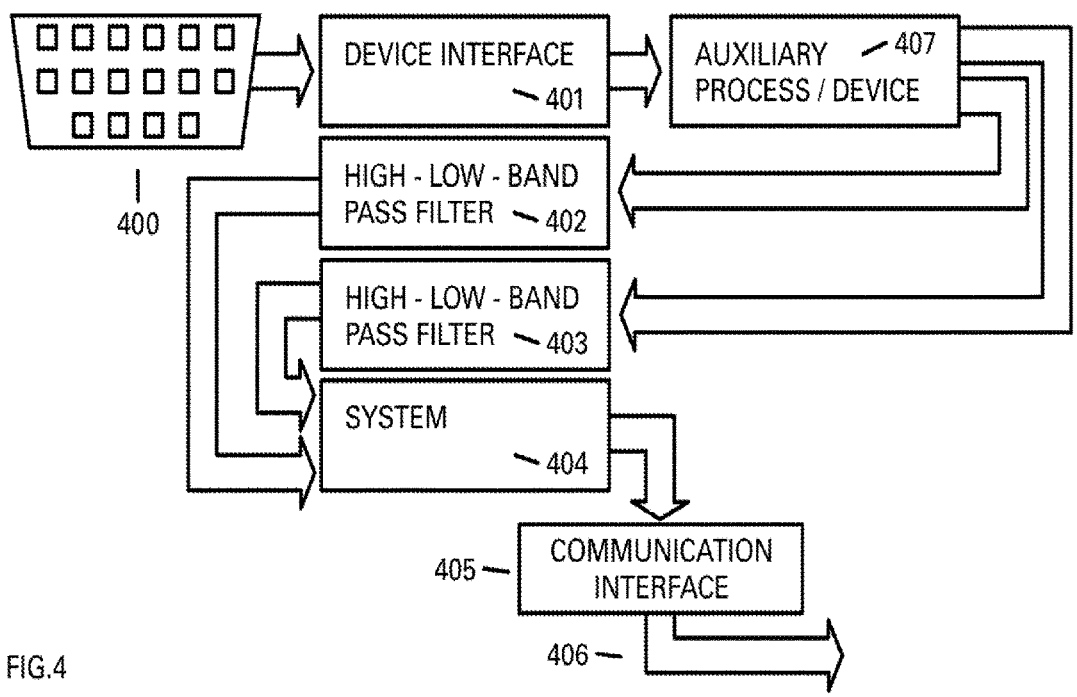
FIG. 4 is a block diagram of a system transmitting data from a thin client to a computer system, according to example embodiments of the present invention.

FIG. 4 illustrates a block diagram of a system for processing and transmitting data from a thin client with a single input device to more than one specific target of a remote computer system, according to example embodiments of the present invention. Any of the described rule sets used to receive data sent from an input device to a remote computer system requires preprocessing that allows error-free extraction of a specific value range by the recipient. Such data may be initiated from a keyboard 400 to a device interface 401, which is used to communicate with the auxiliary process/device 407. Information sent by a single input device of the electronic device to a specific target on a remote computer system may use two or more filters 402 and 403, which act as a high, low, or band-pass filter. Information may be processed by the system 404 and sent via the communication interface 405 and its connection 406.

In case a single input device should be able to target more than one specific peripheral device of a remote electronic device, required filters may be created in analog and/or in digital form. A digital filter operates on numeric values, an analog filter on frequencies, amperage or voltage. A band-pass filter passes values within a certain range and rejects values outside that range. A low-pass filter is a filter that passes low-value signals but rejects values with an amount higher than the cutoff value. A high-pass filter, is a filter that passes high values but rejects values lower than the filter's cutoff value. According to example embodiments of the present invention, the second filter of these filter pairs may be an inversion of the first filter, which results in two identifiable channels. Incoming information from a single input device (e.g. a keyboard) is processed by either the first or the second filter before transmission. Selection of the specific filter for input data can be performed depending on reception of a switching sequence. A switching sequence may be a single or a number of characters, which may be placed before each character to be filtered and/or a chain of data delimited by the switching sequence. Output and input peripheral devices may be targeted by a mirror device. Also, remote control of thin client devices may also be performed.

Figure 8:
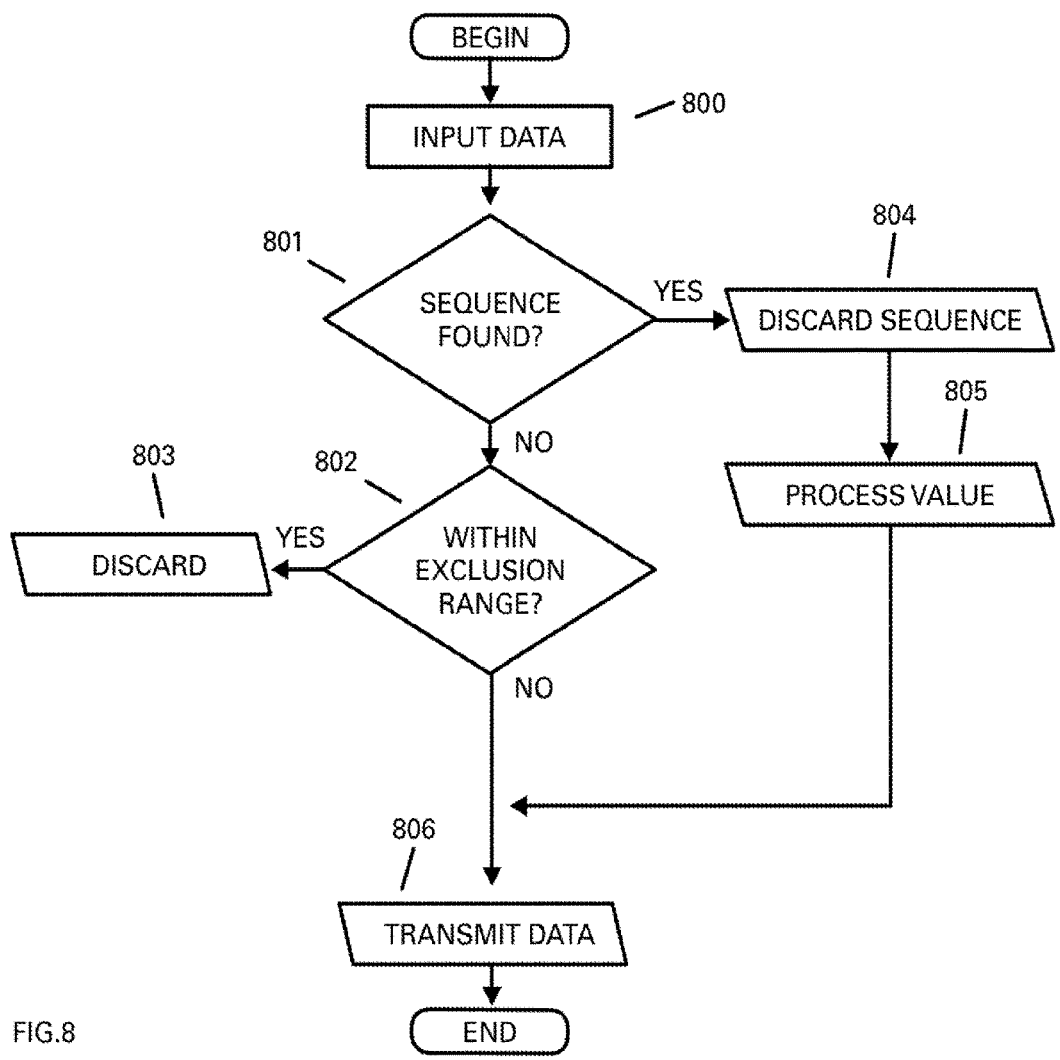
FIG. 8 is a flow chart illustrating a method of processing of input data and transmission from a thin client in accordance with the present invention.

FIG. 8 illustrates a flow chart method of operation according to example embodiments of the present invention. The method may provide pre-processing and transmission of input data from a single input device of an electronic device to a specific peripheral device of a remote system. Referring to FIG. 8, a specific sequence, which may be a combination of single bits, a byte, character or sequence is added to input data 800 that could be received or controlled by a specific peripheral device on a remote system.

As illustrated in the flow chart of FIG. 8, the sequence may be a prefix to each incoming value, for example, a single keystroke value or a delimiter that separates chains of values for different targets. If, as illustrated in operation 801, a sequence is found, then the sequence itself is discarded in operation 804 and the subsequent value or values are processed at operation 805 to fit into the determined target range. If, for example the determined target range is a frequency band from 9500 Hz to 10.000 KHz an incoming keystroke ASCII value "z" (HEX 7A) could be transposed by simple addition, into "–|" (HEX B4). At the remote device, an incoming value of HEX B4 could, after processing as described in FIG. 7, be output as an audible tone at 9580 Hz by an audio component.

To ensure error free separation of values at the receiving device, a range of values may be used which represents an inversion of the determined range of values used for processed information. Input values without a processing sequence that are found at operation 802 to be within this "exclusion range" as illustrated in operation 803, are discarded before transmission at operation 806. If the available range for processed values is too narrow for representation of each value by a unique alternate value, then other variants, such as, multiplying of available values and/or unique combinations of available values can easily be implemented by one skilled in the art.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 15 illustrates an example network element 1500, which may represent any of the above-described network components illustrated in FIGS. 1-14.

Figure 15:
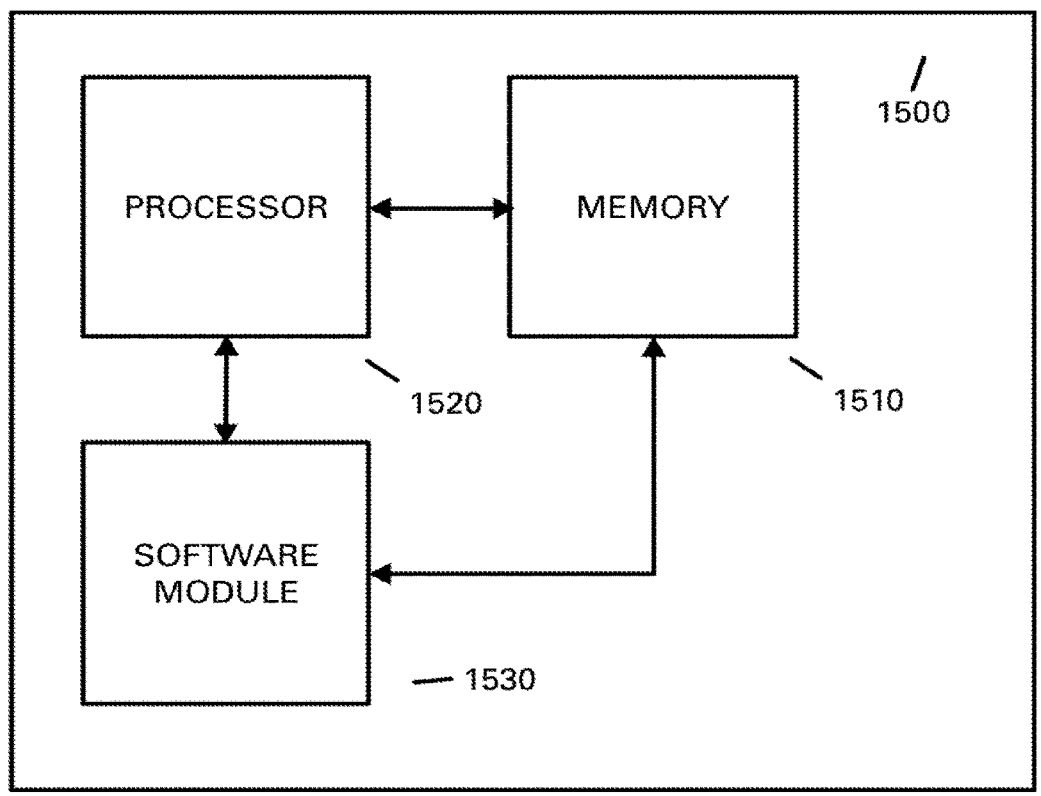
FIG. 15 is a block diagram showing an example networking entity that is configured to store instructions, execute instructions and perform the example methods described throughout the specification, according to example embodiments of the invention.
Figure 16:
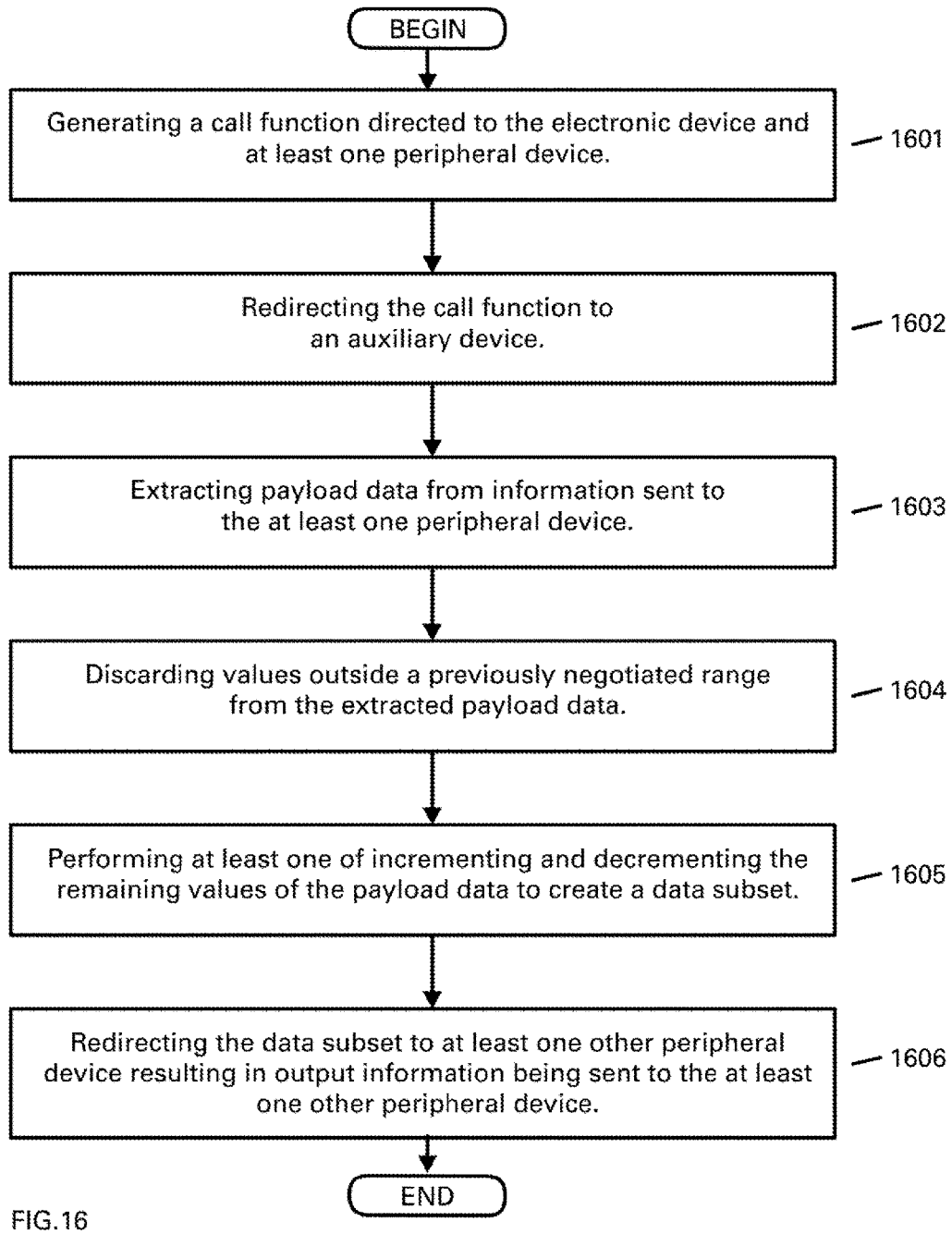
FIG. 16 is an example flow diagram illustrating the operation of an example method of operation, according to example embodiments of the present invention.

As illustrated in FIG. 15, a memory 1510 and a processor 1520 may be discrete components of the network entity 1500 that are used to execute an application or set of operations. The application may be coded in software in a computer language understood by the processor 1520, and stored in a computer readable medium, such as, the memory 1510. The computer readable medium may be a non-transitory computer readable medium that includes tangible hardware components in addition to software stored in memory. Furthermore, a software module 1530 may be another discrete entity that is part of the network entity 1500, and which contains software instructions that may be executed by the processor 1520. In addition to the above noted components of the network entity 1500, the network entity 1500 may also have a transmitter and receiver pair configured to receive and transmit communication signals (not shown).

One example method of adding thin client functionality to an electronic device may include generating a call function directed to the electronic device and at least one peripheral device, at operation 1601. Another example method of operation may include redirecting the call function to an auxiliary device, at operation 1602, and extracting payload data from information sent to the at least one peripheral device, at operation 1603, and discarding values outside a previously negotiated range from the extracted payload data, at operation 1604. Another example operation may include performing at least one of incrementing and decrementing the remaining values of the payload data to create a data subset, at operation 1605 and redirecting the data subset to at least one other peripheral device resulting in output information being sent to the at least one other peripheral device, at operation 1606.

While preferred embodiments of the present invention have been described, it is to be understood that the embodiments described are illustrative only and the scope of the invention is to be defined solely by the appended claims when considered with a full range of equivalents and modifications (e.g., protocols, hardware devices, software platforms etc.) thereto.

What is claimed is:

1. A method, comprising:
    generating a call function directed to an electronic device and at least one peripheral device;
    extracting payload data from information sent to the at least one peripheral device by stripping protocol header information and protocol trailer information;
    discarding values outside a previously negotiated range from the extracted payload data;
    performing at least one of incrementing and decrementing remaining values of the payload data to create a data subset; and
    redirecting the data subset to at least one other peripheral device resulting in output information being sent to the at least one other peripheral device.

2. The method of claim 1, comprising:
    redirecting the call function to an auxiliary device.

3. The method of claim 2, wherein the redirecting the call function to an auxiliary device includes preserving the original call function.

4. The method of claim 1, comprising:
    processing information sent to the electronic device via at least two filters each of which comprises at least one of a high-pass filter, a low-pass filter and a band-pass filter.

5. The method of claim 4, wherein the at least two filters are inverses of each other.

6. The method of claim 4, wherein the information sent to the electronic device is processed by at least one of the at least two filters before it is passed to the electronic device.

7. The method of claim 1, wherein the electronic device adds thin client functionality that provides a communication medium with peripheral devices which include at least one of a keyboard, mouse, speaker, modem, and display.

8. An electronic device, comprising:
    a processor configured to:
        generate a call function directed to an electronic device and at least one peripheral device;
        extract payload data from information sent to the at least one peripheral device by a strip of protocol header information and protocol trailer information;
        discard values outside a previously negotiated range from the extracted payload data;
        perform at least one of increment and decrement values that remain of the payload data to create a data subset; and
    a transmitter configured to redirect the data subset to at least one other peripheral device that results in output information being sent to the at least one other peripheral device.

9. The apparatus of claim 8, wherein the processor is configured to:
    redirect the call function to an auxiliary device.

10. The apparatus of claim 9, wherein the redirect of the call function to an auxiliary device includes a preservation of the original call function.

11. The apparatus of claim 8, wherein the processor is configured to:
    process received information via at least two filters each of which comprises at least one of a high-pass filter, a low-pass filter and a band-pass filter.

12. The apparatus of claim 11, wherein the at least two filters are inverses of each other.

13. The apparatus of claim 11, wherein the information sent to the electronic device is processed by at least one of the at least two filters before it is passed to the electronic device.

14. The apparatus of claim 8, wherein the electronic device adds thin client functionality that provides a communication medium with peripheral devices which include at least one of a keyboard, mouse, speaker, modem, and display.

15. A non-transitory computer storage medium configured to store a computer program that when executed causes a processor to perform:
    generating a call function directed to an electronic device and at least one peripheral device;
    extracting payload data from information sent to the at least one peripheral device by stripping protocol header information and protocol trailer information;
    discarding values outside a previously negotiated range from the extracted payload data;
    performing at least one of incrementing and decrementing remaining values of the payload data to create a data subset; and
    redirecting the data subset to at least one other peripheral device resulting in output information being sent to the at least one other peripheral device.

16. The non-transitory computer storage medium of claim 15,
    wherein the computer program when executed causes the processor to perform:
    redirecting the call function to an auxiliary device.

17. The non-transitory computer storage medium of claim 15, wherein the redirecting the call function to an auxiliary device includes preserving the original call function.

18. The non-transitory computer storage medium of claim 15, wherein the computer program when executed causes the processor to perform:
    processing information sent to the electronic device via at least two filters each of which comprises at least one of a high-pass filter, a low-pass filter and a band-pass filter.

19. The non-transitory computer storage medium of claim 18, wherein the at least two filters are inverses of each other.

20. The non-transitory computer storage medium of claim 18, wherein the information sent to the electronic device is processed by at least one of the at least two filters before it is passed to the electronic device.

* * * * *